(12) United States Patent
Zhao et al.

(10) Patent No.: US 9,601,135 B2
(45) Date of Patent: *Mar. 21, 2017

(54) INTERLAYER FOR DEVICE INCLUDING NFT AND CLADDING LAYERS

(71) Applicant: SEAGATE TECHNHOLOGY LLC, Cupertino, CA (US)

(72) Inventors: Tong Zhao, Eden Prairie, MN (US); Michael Christopher Kautzky, Eagan, MN (US); Michael Allen Seigler, Eden Prairie, MN (US); Yongjun Zhao, Eden Prairie, MN (US); Jay Jayashankar, Minnetonka, MN (US); Xiaoyue Huang, Eden Prairie, MN (US)

(73) Assignee: Seagate Technology LLC, Cupertino, CA (US)

( * ) Notice: Subject to any disclaimer, the term of this patent is extended or adjusted under 35 U.S.C. 154(b) by 13 days.

This patent is subject to a terminal disclaimer.

(21) Appl. No.: 14/607,248

(22) Filed: Jan. 28, 2015

(65) Prior Publication Data
US 2015/0146508 A1 May 28, 2015

Related U.S. Application Data

(63) Continuation of application No. 13/537,758, filed on Jun. 29, 2012, now Pat. No. 8,945,731.

(51) Int. Cl.
*G11B 5/31* (2006.01)
*G11B 5/60* (2006.01)
(Continued)

(52) U.S. Cl.
CPC ........... *G11B 5/314* (2013.01); *G11B 5/6088* (2013.01); *G11B 11/10536* (2013.01);
(Continued)

(58) Field of Classification Search
None
See application file for complete search history.

(56) References Cited

U.S. PATENT DOCUMENTS 6,144,098 A  11/2000 Iyer
8,040,761 B2 * 10/2011 Kawamori ............ G11B 5/3116
369/112.27
(Continued)

FOREIGN PATENT DOCUMENTS

EP  0 580 368  1/1994
EP  0 753 842  1/1997
(Continued)

OTHER PUBLICATIONS

Satoh et al., "Evaluation of Adhesion Materials for Gold Line-and-Space Surface Plasmon Antenna on SO1-MOS Photodiode", Silicon Nanoelectronics Workshop (SNW), 2010, *IEEE*, Piscataway, NJ, USA, Jun. 13, 2010, pp. 1-2.
(Continued)

*Primary Examiner* — Kevin Bernatz
(74) *Attorney, Agent, or Firm* — Mueting, Raasch & Gebhardt, P.A.

(57) ABSTRACT

A device that includes a near field transducer (NFT); at least one cladding layer adjacent the NFT; and a discontinuous metal layer positioned between the NFT and the at least one cladding layer.

20 Claims, 5 Drawing Sheets

(51) Int. Cl.
*G11B 11/105* (2006.01)
*G11B 5/00* (2006.01)

(52) U.S. Cl.
CPC . *G11B 2005/0021* (2013.01); *Y10T 428/1157* (2015.01); *Y10T 428/1171* (2015.01); *Y10T 428/1193* (2015.01)

(56) References Cited

U.S. PATENT DOCUMENTS

| 8,400,902 | B2 | 3/2013 | Huang | |
|---|---|---|---|---|
| 8,945,731 | B2* | 2/2015 | Zhao | G11B 5/314 360/125.3 |
| 2010/0329085 | A1 | 12/2010 | Kawamori | |
| 2011/0096431 | A1 | 4/2011 | Hellwig | |
| 2012/0045662 | A1 | 2/2012 | Zou | |
| 2012/0140609 | A1 | 6/2012 | Huang | |
| 2013/0288077 | A1 | 10/2013 | Dhawan | |
| 2014/0004384 | A1 | 1/2014 | Zhao | |

FOREIGN PATENT DOCUMENTS

| JP | 2007-073702 | 3/2007 |
|---|---|---|
| JP | 2007-242788 | 9/2007 |
| JP | 2009-016869 | 1/2009 |
| JP | 2011-008899 | 1/2011 |
| WO | WO 2013/153195 | 10/2013 |
| WO | WO 2013/163470 | 10/2013 |

OTHER PUBLICATIONS

Vogt, K.W. et al., "Characterization of Thin Titanium Oxide Adhesion Layers on Gold Resistivity, Morphology, and Composition", *Surface Science*, North-Holland, Amsterdam, NL, vol. 301, No. 1-3, Jan. 10, 1994, pp. 203-213.

Metallization: "Metallization"; chapter 5, In: Kris v. Srikrishnan and Geraldine C. Schwartz: "Handbook of Semiconductor Interconnection Technology, Second Edition", 2006, CRC Press, Boca Raton, FL, USA, XP002711255, ISBN:978-1-4200-1765-6, pp. 311-382, Section 5.4.1.2 Adhesion; p. 320.

* cited by examiner

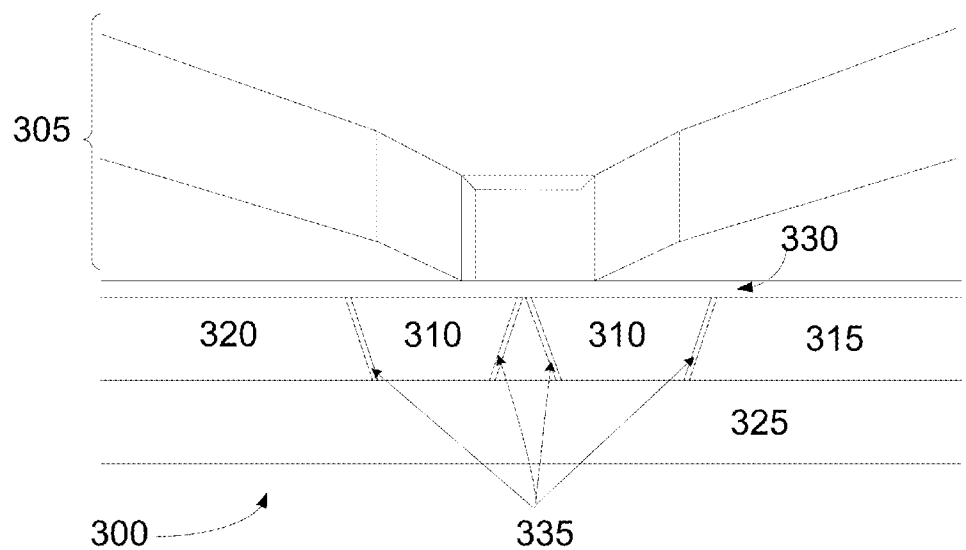
FIG. 3
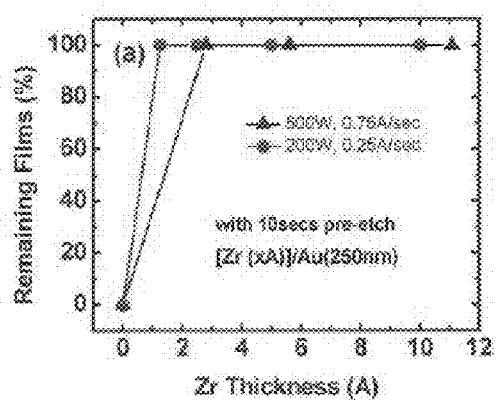
FIG. 4
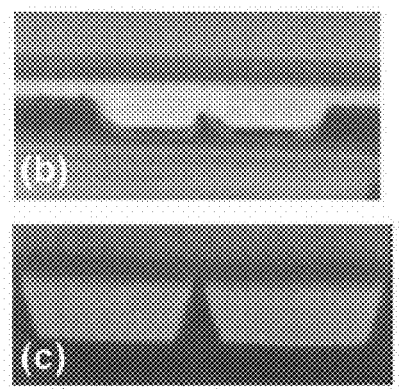
FIG. 5A
FIG. 5B

INTERLAYER FOR DEVICE INCLUDING NFT AND CLADDING LAYERS

This application is a continuation application of U.S. application Ser. No. 13/537,758, filed Jun. 29, 2012 and issued as U.S. Pat. No. 8,945,731, the contents of which is incorporated herein by reference thereto in its entirety.

BACKGROUND

Heat assisted magnetic recording (referred to herein as "HAMR") technology is a promising approach for increasing storage density beyond 1 Tbit/inch$^2$. HAMR heads can utilize near field transducers (NFTs) to heat the magnetic recording layers. Poor adhesion between the materials of the NFT and the surrounding structures in the HAMR head can lead to failure during processing or use. Therefore, there remains a need to decrease such failure.

SUMMARY

Disclosed is a device that includes a near field transducer (NFT); at least one cladding layer adjacent the NFT; and a discontinuous metal layer positioned between the NFT and the at least one cladding layer.

Also disclosed is a device that includes an energy source; a near field transducer (NFT) configured to receive energy from the energy source; at least one cladding layer adjacent the NFT; and a discontinuous metal layer positioned between the NFT and the at least one cladding layer.

Further disclosed is a device that includes a near field transducer (NFT); a front and back cladding layer adjacent the NFT; and a discontinuous metal layer positioned between the NFT and the front cladding layer and the NFT and the back cladding layer.

BRIEF DESCRIPTION OF THE DRAWINGS

FIG. 3 is a perspective view of a portion of a magnetic device including a disclosed discontinuous metal layer.

FIG. 4 shows the percent of a gold film remaining as a function of the thickness of an underlying discontinuous zirconium layer when exposed to an adhesion test.

FIGS. 5A and 5B show cross section scanning electron microscope (SEM) images after downstream chemical mechanical polishing (CMP) processing of a gold NFT without a discontinuous metal layer (FIG. 5A) and with a discontinuous 2.5 Å Zr layer (FIG. 5B).

(FIG. 7B)

The figures are not necessarily to scale. Like numbers used in the figures refer to like components. However, it will be understood that the use of a number to refer to a component in a given figure is not intended to limit the component in another figure labeled with the same number.

DETAILED DESCRIPTION

In the following description, reference is made to the accompanying set of drawings that form a part hereof and in which are shown by way of illustration several specific embodiments. It is to be understood that other embodiments are contemplated and may be made without departing from the scope or spirit of the present disclosure. The following detailed description, therefore, is not to be taken in a limiting sense.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the properties sought to be obtained by those skilled in the art utilizing the teachings disclosed herein.

The recitation of numerical ranges by endpoints includes all numbers subsumed within that range (e.g. 1 to 5 includes 1, 1.5, 2, 2.75, 3, 3.80, 4, and 5) and any range within that range.

As used in this specification and the appended claims, the singular forms "a", "an", and "the" encompass embodiments having plural referents, unless the content clearly dictates otherwise. As used in this specification and the appended claims, the term "or" is generally employed in its sense including "and/or" unless the content clearly dictates otherwise.

"Include," "including," or like terms means encompassing but not limited to, that is, including and not exclusive. It should be noted that "top" and "bottom" (or other terms like "upper" and "lower") are utilized strictly for relative descriptions and do not imply any overall orientation of the article in which the described element is located.

Figure 1:
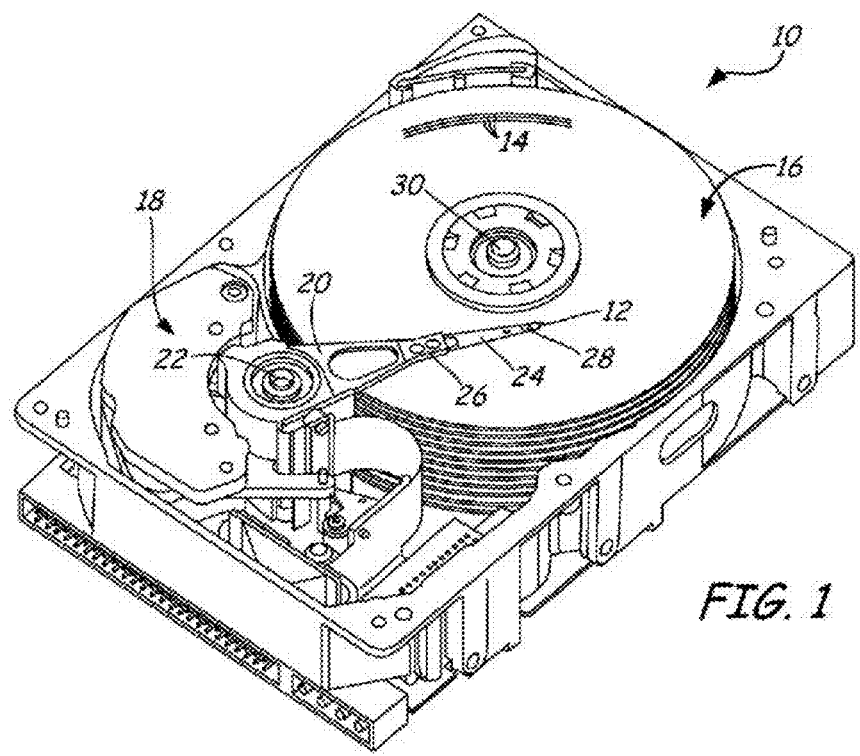
FIG. 1 is a perspective view of a magnetic disc drive that can include HAMR devices.

FIG. 1 is a perspective view of disc drive 10 including an actuation system for positioning slider 12 over track 14 of magnetic medium 16. The particular configuration of disc drive 10 is shown for ease of description and is not intended to limit the scope of the present disclosure in any way. Disc drive 10 includes voice coil motor 18 arranged to rotate actuator arm 20 on a spindle around axis 22. Load beam 24 is connected to actuator arm 20 at head mounting block 26. Suspension 28 is connected to an end of load beam 24 and slider 12 is attached to suspension 28. Magnetic medium 16 rotates around an axis 30, so that the windage is encountered by slider 12 to keep it aloft a small distance above the surface of magnetic medium 16. Each track 14 of magnetic medium 16 is formatted with an array of data storage cells for storing data. Slider 12 carries a magnetic device or transducer (not shown in FIG. 1) for reading and/or writing data on tracks 14 of magnetic medium 16. The magnetic transducer utilizes additional electromagnetic energy to heat the surface of medium 16 to facilitate recording by a process termed heat assisted magnetic recording (HAMR).

Figure 2:
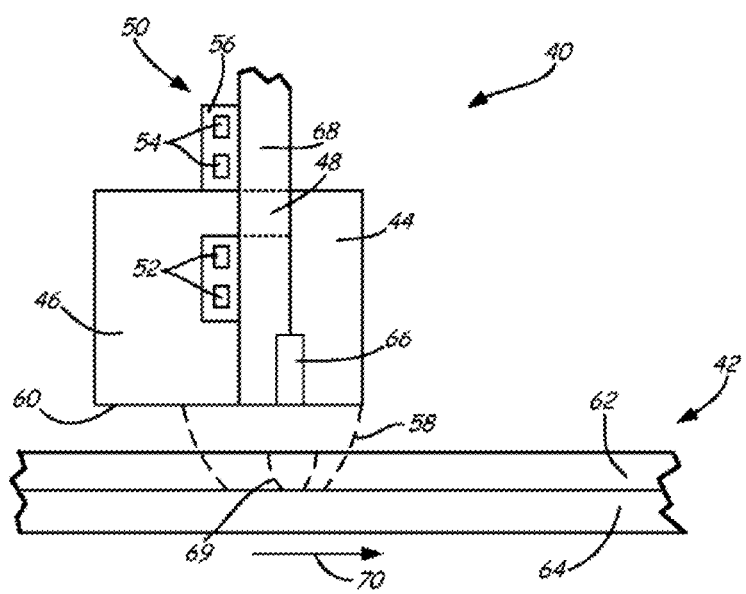
FIG. 2 is a cross sectional view of a perpendicular HAMR magnetic recording head and of an associated recording medium.

A HAMR transducer includes a magnetic writer for generating a magnetic field to write to a magnetic medium (e.g. magnetic medium 16) and an optical device to heat a portion of the magnetic medium proximate to the write field. FIG. 2 is a cross sectional view of a portion of a magnetic device, for example a HAMR magnetic device 40 and a portion of associated magnetic storage medium 42. HAMR magnetic device 40 includes write pole 44 and return pole 46 coupled by pedestal 48. Coil 50 comprising conductors 52 and 54 encircles the pedestal and is supported by an insulator 56. As shown, magnetic storage medium 42 is a perpendicular magnetic medium comprising magnetically hard storage layer 62 and soft magnetic underlayer 64 but can be other forms of media, such as patterned media. A current in the coil induces a magnetic field in the pedestal and the poles. Magnetic flux 58 exits the recording head at air bearing surface (ABS) 60 and is used to change the magnetization of portions of magnetically hard layer 62 of storage medium 42 enclosed within region 58. Near field transducer 66 is positioned adjacent the write pole 44 proximate air bearing surface 60. Near field transducer 66 is coupled to waveguide 68 that receives an electromagnetic wave from an energy source such as a laser. An electric field at the end of near field transducer 66 is used to heat a portion 69 of magnetically hard layer 62 to lower the coercivity so that the magnetic field from the write pole can affect the magnetization of the storage medium.

Magnetic devices disclosed herein can also include other structures. Magnetic devices disclosed herein can also be incorporated into larger devices. For example, sliders can include magnetic devices as disclosed herein. Exemplary sliders can include a slider body that has a leading edge, a trailing edge, and an air bearing surface. The write pole, read pole, optical near field transducer and contact pad (and optional heat sink) can then be located on (or in) the slider body. Such exemplary sliders can be attached to a suspension which can be incorporated into a disc drive for example.

FIG. 3 depicts a partial perspective view of a portion of a magnetic device. The magnetic device 300 can include a write pole 305 (which may have characteristics as discussed above) and a near field transducer (NFT) 310. The NFT 310 depicted in FIG. 3 can be described as having a two part structure, but it should be recognized that the described embodiments can be utilized with any type or structure of NFT (for example plasmonic gap type NFTs or peg and disc type NFTs, which can also be referred to as "lollipop" type NFTs). Typically, the NFT 310 can be made of materials, such as for example gold (Au), gold (Au) doped with another material (for example, AuGe), silver (Ag), silver (Ag) doped with another material (for example, AgGe), copper (Cu), and aluminum (Al). In some embodiments, the NFT 310 can also be made of materials listed in U.S. Patent Publication 2011/0205863 entitled "HAMR NFT Materials with Improved Thermal Stability," filed Feb. 23, 2011, the disclosure of which is incorporated herein by reference thereto.

A disclosed magnetic device also includes at least one cladding layer. The exemplary magnetic device 300 includes front cladding 315 and 320, bottom cladding 325, and top cladding 330. Generally, in the described embodiment, the NFT 310 is entirely surrounded by cladding materials. The at least one cladding layer (and in this embodiment, the front cladding 315 and 320, the bottom cladding 325, and the top cladding 330) can generally be formed from dielectric materials having low (relative to the material of the NFT) index of refractions. Exemplary materials include $Ta_2O_5$, $Al_2O_3$, $SiO_2$, MgO, $MgF2$, $Si_3N_4$, SiON, and $TaSiO_x$. Materials disclosed in United States Patent Publication No. 2011/0205864, entitled "Optical Waveguide Clad Material", filed Feb. 23, 2011, the disclosure of which is incorporated herein by reference thereto, can also be utilized for the front cladding 315 and 320, the bottom cladding 325, the top cladding 330, or some combination thereof. Additional illustrative materials can include oxides of yttrium (e.g., $Y_2O_3$); binary oxides such as combinations of a metal oxide ($MeO_x$) and $AlO_x$, where $MeO_x$ is a high refractive index (n) material, and wherein 0<x<3.0, e.g., x=1, 1.5, 2, 2.5, metal elements with high-n, low-loss oxides include Ti, Hf, Zr, Nb, and Ta; binary oxides such as combinations of $Y_2O_3$ and $AlO_x$; binary oxides such as combinations of $SiO_2$ and $Al_2O_3$; binary oxides such as combinations of $Y_2O_3$ and $SiO_2$; binary oxides such as combinations of $MeO_x$ and $SiO_2$ where $MeO_x$ is a high refractive index (n) material, and wherein 0<x<3.0, e.g., x=1, 1.5, 2, 2.5, metal elements with high-n, low-loss oxides include Ti, Hf, Zr, Nb, and Ta; and silicon oxynitrides ($SiO_xN_y$), where x can range from 0 to about 2.0 and y can range from 0 to about 1.33. In embodiments, the cladding layers are made of $Al_2O_3$ or $SiO_2$ for example.

It can often be difficult to get the NFT 310 to adhere well to the surrounding cladding layers. If the NFT 310 does not have good adhesion to the materials surrounding it, the magnetic device can fail during processing or during operation of the magnetic device. Disclosed magnetic devices also include discontinuous metal layer 335. It should be noted that discontinuous metal layer can, but need not be a single layer. The phrase "discontinuous metal layer" can be utilized to refer to more than one structure or layer that is positioned between the NFT and surrounding cladding layers. A disclosed discontinuous metal layer can generally be located between a surface of an NFT and an adjacent surrounding cladding layer. In embodiments, a discontinuous metal layer can be positioned between each surface of the NFT and each surrounding cladding layer; and in embodiments, a discontinuous metal layer can be positioned between less than each surface of the NFT and the surrounding cladding layers. In embodiments, a discontinuous metal layer can be positioned between surfaces of the NFT that are in contact with the front cladding layers 315 and 320, the bottom cladding layer 325, the top cladding layer 330, or some combination thereof. In some embodiments, a discontinuous metal layer can be in contact with substantially of the front cladding layers 315 and 320, and substantially all of the bottom cladding layer 325. In some embodiments, deposition processes could be controlled so that the discontinuous metal layer 330 preferentially contacts some or all of the surfaces of the various cladding layers.

Disclosed discontinuous metal layers can generally be formed from materials that could provide enhanced chemical bonding with the cladding layer; have no or limited interface reactions; have acceptable levels of NFT coupling efficiency loss; or some combination thereof.

Materials that could provide enhanced chemical bonding with the cladding layer can also be described as materials with at least a partially filled conduction band, or in some embodiments, an empty conduction band. An empty conduction band makes it easier for the material to accept additional electrons and form chemical bonds with oxygen (from the cladding layer). The materials can also be described as those that are early 3d transition metals having large populations of unfilled states at the Fermi level and that can participate in donor-acceptor type bonding (electrons from the cladding material (for example, an oxide anion (oxygen) atoms) can transfer into the unfilled 3d states of the discontinuous metal layer). Materials that could provide enhanced chemical bonding with the cladding layer can also be described as materials that have larger negative heat of formation of their oxides. Such materials would have a better chance to bond well with oxide substrates because such a bond would be thermodynamically favored. Such materials can include for example zirconium (Zr), titanium (Ti), yttrium (Y), scandium (Sc), aluminum (Al), ruthenium (Ru), vanadium (V), silicon (Si), germanium (Ge), tantalum (Ta), and tin (Sn).

Materials that have no or limited interface reactions include materials that generally don't or have minimal diffusion into the NFT and/or cladding materials. Such materials also generally don't have intermetallic formation. The material desirably would maintain such properties up to temperatures of about 400° C. This could allow (or ensure) minimal degradation of the optical properties of the NFT material and good thermal stability.

Materials that provide acceptable levels of NFT coupling efficiency loss are also desired. The discontinuous nature of the discontinuous metal layer also contributes to the acceptable level of coupling efficiency loss. Such materials can generally have relatively high indices of refraction. The presence of a non-plasmonic metal layer, e.g., the discontinuous metal layer, at the interface of the NFT material and the cladding material layer is thought to "dampen" the ability of that interface to support surface plasmons, this can result in weaker electric field emission from the NFT. In general for resonance-based NFTs, the figure of merit (FOM) for efficiency can be considered to be the ratio of the real to the imaginary part of the complex optical permittivity. Introduction of a non-plasmonic metal with either small negative or positive real part and/or larger positive imaginary part may cause the net FOM to degrade. The degradation of the FOM can be minimized by decreasing the thickness of the layer.

In some embodiments, disclosed discontinuous metal layers can be formed from zirconium (Zr), titanium (Ti), yttrium (Y), scandium (Sc), aluminum (Al), ruthenium (Ru), vanadium (V), silicon (Si), or germanium (Ge), tantalum (Ta), and Tin (Sn). In some embodiments, disclosed discontinuous metal layers can be made of Zr.

Disclosed discontinuous metal layers can be described as being composed of numerous "islands" of metal material. The islands can, but need not have disparate sizes and shapes. The islands can, but need not, be entirely irregular in nature. Disclosed discontinuous metal layers can be described as less than a monolayer thick, or have an average thickness that is less than a monolayer thick. Disclosed discontinuous metal layers can be described by an average thickness. It is to be understood that the material of disclosed discontinuous metal layers will typically not be present across the entire layer. In embodiments, disclosed discontinuous metal layers can have an average thickness from 2.5 Å to 50 Å; from 5 Å to 30 Å; or from 5 Å to 20 Å.

The average thickness of a discontinuous metal layer can be measured by transmission electron microscopy (TEM), or x-ray photoelectron spectroscopy (XPS) for example. The thickness can be determined using calibration from standard samples having known thicknesses.

An exemplary method of forming disclosed discontinuous metal layers can include magnetron sputtering using an ultraslow deposition rate. Generally, the process is set to target a thickness less than that of a metal monolayer, and a discontinuous layer is formed. One exemplary method of forming disclosed discontinuous metal layers is in-situ deposition, where the discontinuous metal layer and the NFT layer are deposited without breaking vacuum. Such a method can discourage oxidation of the discontinuous metal layer, which could compromise its adhesive properties. Another exemplary method of forming disclosed discontinuous metal layers can include low-energy processes such as chemical vapor deposition (CVD) or atomic layer deposition (ALD). When using such techniques, the absence of adatom mobility and high metal surface free energy relative to the material of the cladding layer causes a somewhat (or in embodiments very) regular distribution of small diameter islands to be grown. This promotes topographical interlocking at the NFT/cladding layer interface. An island like film structure can also be formed using "activated dewetting" of the material, in which an ambient metal deposition is followed by a rapid thermal anneal to promote segregation of the film into islands.

Discontinuous metal layers are thought to provide enhanced chemical bonding, nanoscale topography, limited interface reactions (diffusion, intermetallic formation), or some combination thereof in order to improve adhesion between the NFT and the at least one cladding layer. Because of the discontinuous nature of the discontinuous metal layer, the material of the discontinuous metal layer occupies only a small fraction of the active plasmonic interface of the NFT. This allows adhesion to be enhanced without detrimentally affecting the optical properties of the NFT.

Processes to form the discontinuous metal layer could be easily integrated into the overall manufacturing process of the magnetic device. Overall, the use of disclosed discontinuous metal layers would decrease or eliminate yield loss due to delamination of the NFT and contribute to increased NFT lifetime during the operation of the magnetic device with very little effect on current formation processes for the magnetic device.

It was also found that use of disclosed discontinuous metal layers improves the mechanical strength of the NFT material by modifying the crystal structure of the NFT material. For example, in an embodiment where the NFT is made of gold, use of disclosed discontinuous metal layers increases the Au (111) population, which improves Au grain stability and stress relaxation resistance up to about 300° C. This can contribute to long term reliability of the NFT and therefore the overall magnetic device. In embodiments, the inclusion of a discontinuous metal layer can increase the mechanical strength of an adjacent layer (such as a gold NFT layer) which can ultimately lead to enhanced performance, stability, and long-term reliability in mechanical devices, such as heat assisted magnetic recording (HAMR) heads that include the disclosed discontinuous metal layer.

EXAMPLES

While the present disclosure is not so limited, an appreciation of various aspects of the disclosure will be gained through a discussion of the examples provided below.

Adhesion with Discontinuous Metal Layer

A three layer structure of: $SiO_2/x$ Å $Zr/2500$ Å Au was fabricated. The substrate was first pre-etched in the vacuum chamber using an argon (Ar) ion etch to clean the surface of the substrate. The Zr film was then formed by direct current (DC) Magnetron sputtering from a zirconium (Zr) target. A sheet film tape test was performed on the structures to determine the percentage of the films remaining A sheet film test is done by depositing the film on a wafer, then applying tape (sticky side down) onto the film and pulling it off. Strongly adhering films will stay bonded to the substrate and the tape will pull off with no film fragments. Poorly adhering films will pull the film off with the tape. FIG. 4 shows the percentage remaining as a function of the zirconium (Zr) thickness at 200 W and 500 W. As seen in FIG. 4, without a discontinuous Zr layer, the gold doesn't adhere well and 100% of the gold film was pulled off. With the addition of even a 1.25 Å discontinuous Zr layer, adhesion of the gold to the $SiO_2$ is enhanced, as evidenced by the structure surviving the tape test.

Discontinuous Metal Layer with NFT Structure

FIGS. 5A and 5B show cross section scanning electron microscope (SEM) images after downstream chemical mechanical polishing (CMP) processing of a gold NFT without a discontinuous metal layer (FIG. 5A) and with a discontinuous 2.5 Å Zr layer (FIG. 5B). As seen in FIG. 5A, without a disclosed discontinuous metal layer, the gold NFT was pulled out from the trench in the cladding layer. With a 2.5 Å Zr layer, as seen in FIG. 5B, the gold NFT remains firmly adhered in the trench in the cladding layer even after the CMP.

Optical Properties

Figures 6A, 6B:
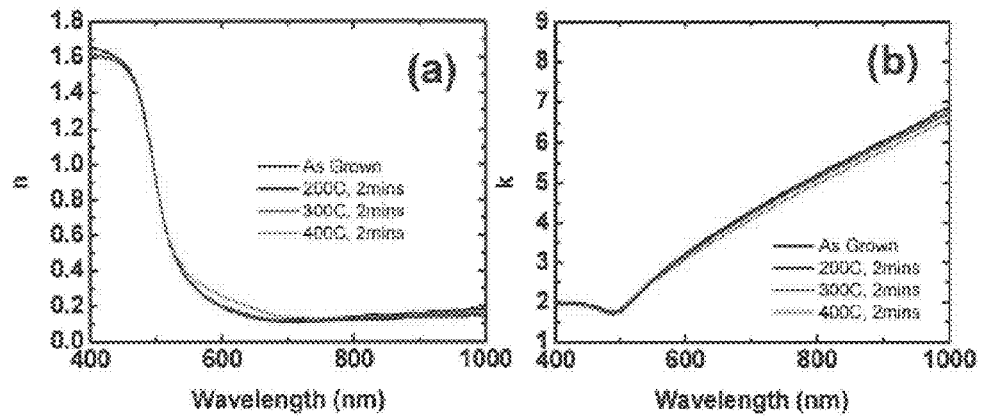
FIG. 6A shows the index of refraction (n) and FIG. 6B shows the extinction coefficient (κ) of a Zr discontinuous layer/Au layer film stack in the wavelength range from 400 nm to 1000 nm as a function of annealing temperature.

The optical properties of a structure including a disclosed discontinuous metal layer was evaluated by measuring the index of refraction (n) and the extinction coefficient (κ) over wavelengths from 400 nm to 1000 nm as deposited and after annealing at various conditions. FIG. 6A shows the index of refraction (n) and FIG. 6B shows the extinction coefficient (κ) from 400 nm to 1000 nm of a structure including a 100 nm of Au layer on top of 2.5 Å Zr as grown, after annealing at 200° C. for two minutes, after annealing at 300° C. for two minutes, and after annealing at 400° C. for two minutes. As seen in FIG. 6A, there is no optical degradation, indicating that the Zr/Au interface is chemically stable up to 400° C.

Chemical Stability

The chemical stability of the interface was also investigated using x-ray diffraction. κ~2θ scans of Zr/Au film stacks with various Zr thicknesses as grown (FIG. 7A) and after annealing at 300° C. (FIG. 7B) can be seen in FIGS. 7A and 7B. As seen in both figures, Au is present mostly in the (111) orientation, but without the discontinuous Zr layer there are (200) and (311) orientations as well. With the discontinuous Zr layer, the non (111) orientations have been mostly eliminated. It should be noted that for face-centered cubic ("fcc") metals, (111) is generally the most energetically stable orientation since it is the lowest energy face to present at the film/ambient interface. By comparing FIGS. 7A and 7B, it can be seen that there is not additional phase formation in the film stacks, indicating minimal chemical reaction between the two materials.

Mechanical Strength of Au Layer

Figures 7A, 7B:
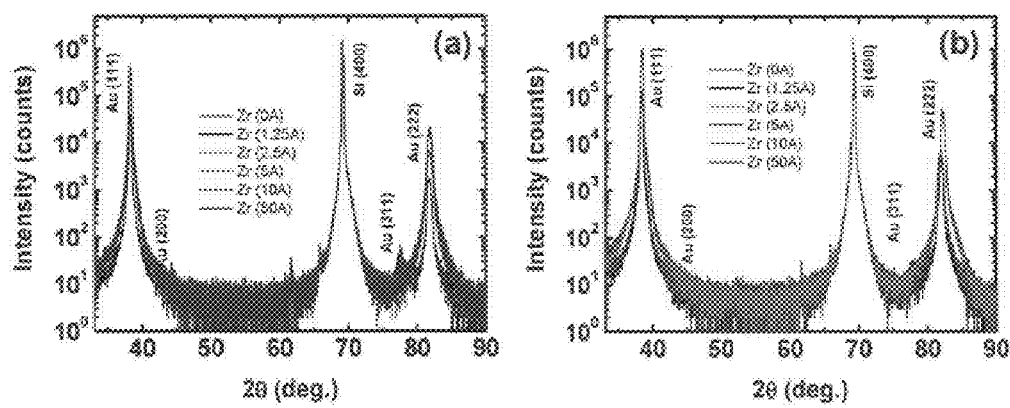
FIGS. 7A and 7B are θ~2θ scans of Zr/Au film stacks with various Zr thicknesses as grown (FIG. 7A) and after annealing at 300° C.
Figures 8A, 8B, 8C, 8D:
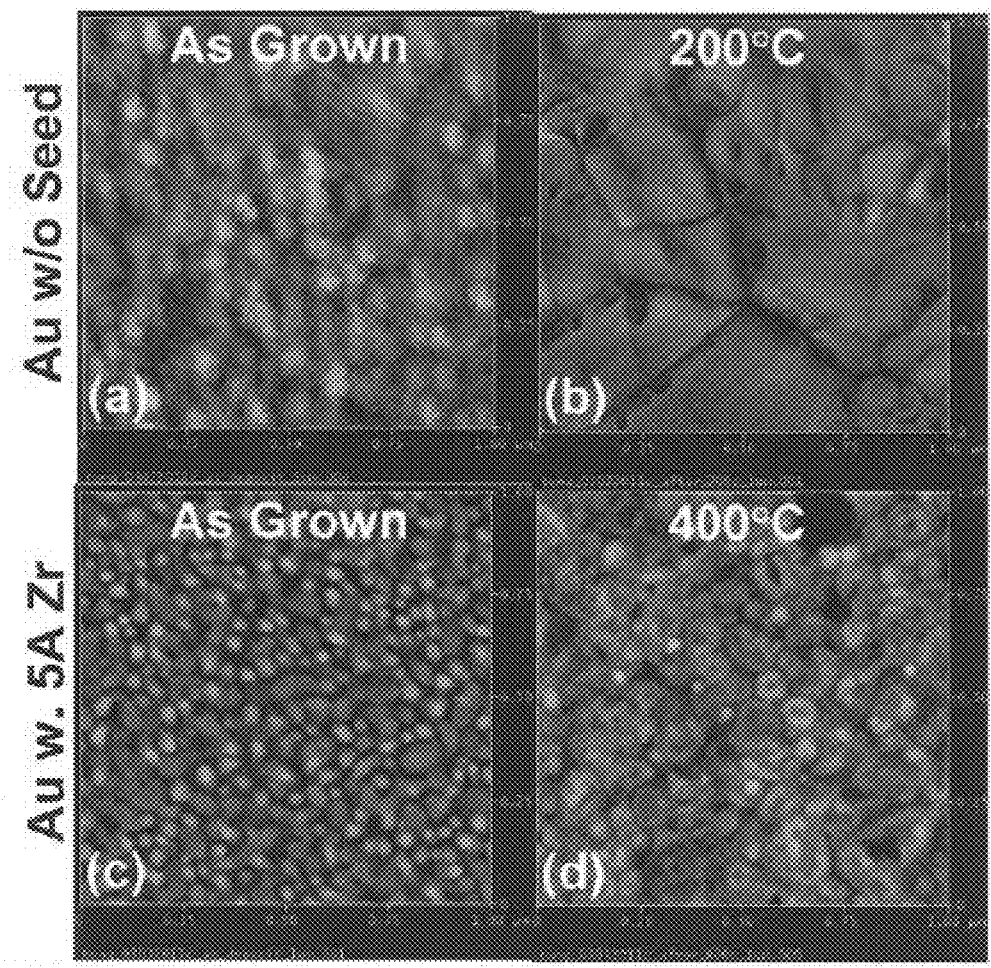
FIGS. 8A through 8D shows atomic force microscopy (AFM) images of 150 nm Au films without and with discontinuous Zr layers before and after annealing.
Figure 9A:
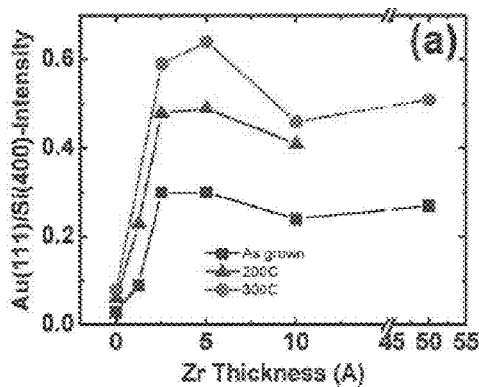
FIGS. 9A and 9B depict the effect of the Zr thickness on the Au (111) population (FIG. 9A) and Au grain size (FIG. 9B).
Figure 9B:
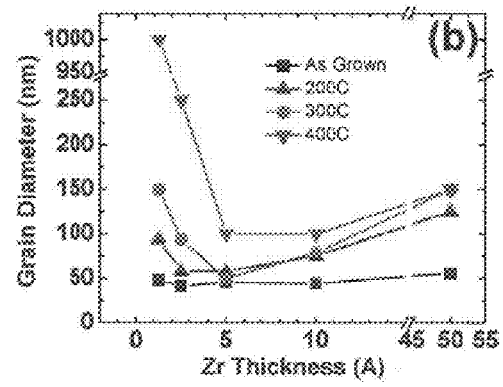

FIGS. 8A through 8D shows atomic force microscopy (AFM) images of 150 nm Au films without and with a 5 Å discontinuous Zr layers before and after annealing. By comparing FIGS. 8A and 8B, it can be seen that the gold layer without the adjacent discontinuous Zr layer undergoes significant grain growth after annealing at 200° C. As seen by comparing FIGS. 8C and 8D, with the 5 Å Zr layer, the grain growth is dramatically slowed down even after 400° C. annealing. Furthermore, there appears to be a Zr thickness effect on the Au (111) population (FIG. 9A) and Au grain size (FIG. 9B) and stability. As seen in previous FIG. 7A, the Au (111) orientation population increases with Zr thickness and peaks at 5 Å of Zr. Generally, there is a correlation between stronger mechanical strength and Au (111) orientation. This is most likely due to less grain growth/reorientation related mechanical softening mechanisms. FIG. 7B shows Au grain size as a function of Zr thickness at different annealing temperatures. Grain growth is one of the mechanical softening mechanisms and to slow it down at elevated temperatures will improve the mechanical strength. 5 Å of Zr appears to promote the smallest Au grain size and the least grain growth up to 400° C.

Mechanical Stability

Figure 10A:
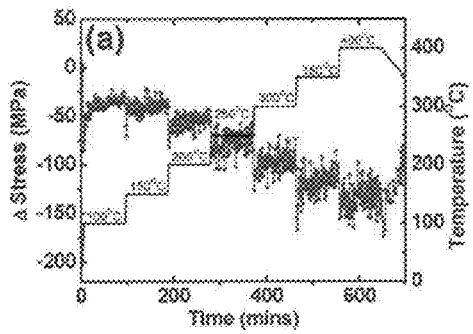
FIGS. 10A and 10B show the thermal stress that is generated in an Au film without (FIG. 10A) and with (FIG. 10B) a disclosed discontinuous metal layer as the films are heated.
Figure 10B:
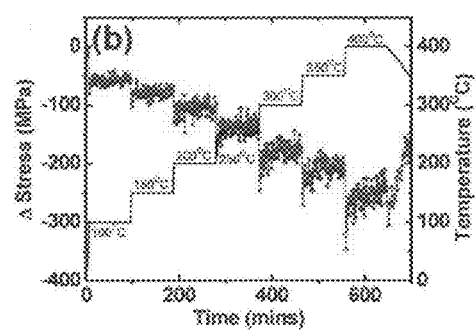

The improvement in Au (111) orientation and Au grain stability observed above was shown to translate into improved stress relaxation temperature, which is a measure of mechanical stability, i.e., plastic deformation or creep. This phenomenon was measured by heating the film and monitoring the stress generated. Upon heating, compressive stress will be generated in Au films due to the mismatch in the coefficient of thermal expansion between the Au film and the Si substrate. The temperature is kept constant at each temperature (the stair step line in the figures) in order to measure the evolution of stress in the Au film. FIG. 10A shows the generated thermal stress as Au starts to relax from as low as 100° C. without a discontinuous Zr layer, indicating that plastic deformation starts from this temperature. FIG. 10B shows that with a 5 Å Zr discontinuous layer, such relaxation doesn't take place until 250-300° C., indicating improved resistance to plastic deformation and mechanical stability, which will ultimately improve the reliability of devices that include a NFT with a discontinuous layer.

Figure 11:
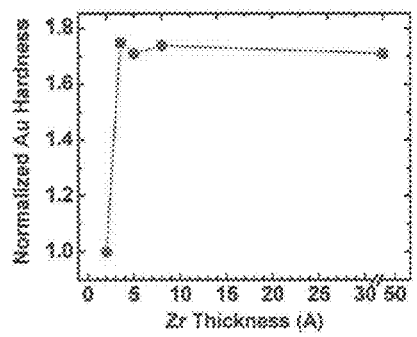
FIG. 11 is a graph showing the normalized nanoindentation hardness of 150 nm thick Au films with various thicknesses discontinuous Zr films adjacent thereto.

The enhancement of the mechanical strength of the Au film by the discontinuous layer was further confirmed by nanoindentation hardness measurements. As shown in FIG. 11, the hardness of the gold is enhanced by about 70% with a discontinuous Zr layer as thin as 2.5 Å.

Thus, embodiments of INTERLAYER FOR DEVICE INCLUDING NFT AND CLADDING LAYERS are disclosed. The implementations described above and other implementations are within the scope of the following claims. One skilled in the art will appreciate that the present disclosure can be practiced with embodiments other than those disclosed. The disclosed embodiments are presented for purposes of illustration and not limitation.

What is claimed is:

1. A device comprising:
   a near field transducer (NFT);
   at least one cladding layer adjacent the NFT, the cladding layer comprising
   $SiO_2$; $Al_2O_3$; MgO; $TaSiO_x$; $MgF_2$; SiON; $Y_2O_3$;
   binary oxides of a metal oxide ($MeO_x$) and $AlO_x$, where Me is Ti, Hf, Zr, Nb, and Ta and 0<x<3.0;
   binary oxides of $Y_2O_3$ and $AlO_x$;
   binary oxides of $SiO_2$ and $Al_2O_3$;
   binary oxides of $Y_2O_3$ and $SiO_2$; binary oxides of $MeO_x$ and $SiO_2$ where Me is Ti, Hf, Zr, Nb, and Ta and 0<x<3.0;
   $SiO_xN_y$, where 0<x<2.0 and 0<y<1.33; or
   combinations thereof; and
   a discontinuous metal layer positioned between the NFT and the at least one cladding layer.

2. The device according to claim 1, wherein the at least one cladding layer comprises: $SiO_2$, $Al_2O_3$, MgO, $Y_2O_3$, $TaSiO_x$, $MgF_2$, SiON, or combinations thereof.

3. The device according to claim 1, wherein the NFT comprises gold (Au), gold (Au) doped with another material, silver (Ag), silver (Ag) doped with another material, copper (Cu), or aluminum (Al).

4. The device according to claim 1, wherein the NFT comprises gold.

5. The device according to claim 1, wherein the discontinuous metal layer has an average thickness of from about 2.5 Å to about 50 Å.

6. The device according to claim 1, wherein the discontinuous metal layer has an average thickness of from about 5 Å to about 30 Å.

7. The device according to claim 1, wherein the discontinuous metal layer has an average thickness of from about 5 Å to about 20 Å.

8. The device according to claim 1, wherein the discontinuous metal layer comprises an early 3d transition metals having large populations of unfilled states at the Fermi level.

9. The device according to claim 1, wherein the discontinuous metal layer comprises a material selected from: Zr, Ti, Y, Sc, Al, Ru, V, Si, Ge, Ta, and Sn.

10. The device according to claim 1, wherein the discontinuous metal layer comprises Zr.

11. A device comprising:
a near field transducer (NFT);
at least one cladding layer adjacent the NFT, the cladding layer comprising $SiO_2$, $Al_2O_3$, MgO, $Y_2O_3$, $TaSiO_x$, $MgF_2$, SiON, or combinations thereof; and
a discontinuous metal layer positioned between the NFT and the at least one cladding layer.

12. The device according to claim 11, wherein the NFT comprises gold (Au), gold (Au) doped with another material, silver (Ag), silver (Ag) doped with another material, copper (Cu), or aluminum (Al).

13. The device according to claim 11, wherein the NFT comprises gold.

14. The device according to claim 11, wherein the discontinuous metal layer has an average thickness of from about 2.5 Å to about 50 Å.

15. The device according to claim 11, wherein the discontinuous metal layer has an average thickness of from about 5 Å to about 30 Å.

16. The device according to claim 11, wherein the discontinuous metal layer has an average thickness of from about 5 Å to about 20 Å.

17. A device comprising:
an energy source;
a near field transducer (NFT) configured to receive energy from the energy source;
at least one cladding layer adjacent the NFT, the at least one cladding layer comprising $SiO_2$, $Al_2O_3$, MgO, $Y_2O_3$, $TaSiO_x$, $MgF_2$, SiON, or combinations thereof; and
a discontinuous metal layer positioned between the NFT and the at least one cladding layer.

18. The device according to claim 17, wherein the energy source comprises a laser.

19. The device according to claim 17, wherein the discontinuous metal layer comprises a material selected from: Zr, Ti, Y, Sc, Al, Ru, V, Si, Ge, Ta, and Sn.

20. The device according to claim 17, wherein the discontinuous metal layer comprises Zr.

* * * * *